United States Patent
Krishnaswamy et al.

(10) Patent No.: US 12,529,686 B2
(45) Date of Patent: Jan. 20, 2026

(54) SOIL GAS-FLUX MEASUREMENT SYSTEM

(71) Applicant: Wisconsin Alumni Research Foundation, Madison, WI (US)

(72) Inventors: Bhuvana Krishnaswamy, Madison, WI (US); Jinyi Huang, Madison, WI (US); Francisco Arriaga, Cross Plains, WI (US); Christian Martinez, Genoa City, WI (US); Hendri Yuda Winanto, Madison, WI (US); Adam Nygard, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 348 days.

(21) Appl. No.: 18/307,191

(22) Filed: Apr. 26, 2023

(65) Prior Publication Data
US 2024/0361287 A1    Oct. 31, 2024

(51) Int. Cl.
G01N 33/00    (2006.01)
G01N 21/17    (2006.01)
G01N 33/24    (2006.01)

(52) U.S. Cl.
CPC ..... *G01N 33/0032* (2013.01); *G01N 21/1702* (2013.01); *G01N 33/246* (2013.01); *G01N 2021/1704* (2013.01); *G01N 2201/0238* (2013.01)

(58) Field of Classification Search
None
See application file for complete search history.

(56) References Cited

U.S. PATENT DOCUMENTS

| | | | |
|---|---|---|---|
| 8,153,959 B1 * | 4/2012 | Stieff | G01T 1/178 250/253 |
| 9,647,718 B2 | 5/2017 | Seller | |
| 12,158,448 B2 * | 12/2024 | Debie | G01N 29/222 |
| 2003/0136174 A1 * | 7/2003 | Edwards | G01N 1/2294 73/863.52 |
| 2007/0144276 A1 * | 6/2007 | Johnson | G01N 1/2294 73/19.01 |
| 2022/0074914 A1 * | 3/2022 | Koeppel | G06N 3/08 |

* cited by examiner

*Primary Examiner* — Suman K Nath
(74) *Attorney, Agent, or Firm* — Boyle Fredrickson, SC

(57) ABSTRACT

A low-cost soil gas-flux monitor provides localized sensors eliminating the need for a tethered analysis unit and permitting flexible sensor locations enabled by wireless and conduit-less interconnectivity. A housing form factor permits a low-power door actuation for venting making the necessary battery operation practical.

16 Claims, 2 Drawing Sheets

SOIL GAS-FLUX MEASUREMENT SYSTEM

STATEMENT REGARDING FEDERALLY SPONSORED RESEARCH OR DEVELOPMENT

This invention was made with government support under 2034415 awarded by the National Science Foundation. The government has certain rights in the invention.

CROSS REFERENCE TO RELATED APPLICATION

- - -

BACKGROUND OF THE INVENTION

The present invention relates to systems for measuring gas flux passing between the soil and the atmosphere and in particular to a low-cost system simplifying such gas-flux measurements.

Soil produces or consumes gases such as carbon dioxide, methane, nitrous oxide, ammonia, and oxygen through normal biological and geological processes. Accurate characterization this gas flux is important in understanding greenhouse gas emissions and assessing carbon sequestration techniques, for example, those incorporating biochar into soil.

The measurement of gas flux in soil may employ multiple collection chambers placed against the soil and attached by conduits to a central gas analyzer, for example, an infrared spectrometer that can measure multiple different gas concentrations. The collection chambers may use a soil ring resting on the soil and a movable collection dome placed about the soil ring during measurement and then lifted away from the soil ring after measurement to flush the collection chamber volume with ambient air. Relatively large chambers may be employed to ensure a sufficient area of soil is covered to obtain accurate sampling.

Current soil gas-flux measurement systems are expensive and can be difficult to deploy, greatly limiting their application for many important uses.

SUMMARY OF THE INVENTION

The present invention provides a low-cost soil gas-flux measurement system using gas-specific sensors that may be distributed among compact collection chambers. By eliminating the need for fluid communication to a central analyzer (through hoses or the like) and employing a low-mass vent door design, a practical wireless battery power system can be produced having low-cost and flexible deployment. These benefits increase the spatial sampling of the soil to offset potential loss of accuracy from the low-cost sensors and small area of the collection chamber.

Specifically, in one embodiment, the invention provides a soil gas-flux monitor system having at least one chamber formed of a housing with a lower surface for supporting the housing on a soil surface, the lower surface having a first opening positioned to receive gases from the soil surface into a volume of the housing. The housing supports a motorized door attached to a second opening in the housing to move between a closed position covering the second opening and an open position revealing the second opening to allow a free flow of outside air within the volume of the housing. In addition, the housing supports an electronic carbon dioxide sensor to measure carbon dioxide in the volume of the housing and an electronic temperature sensor supported by the housing to measure temperature in the volume of the housing. An electronic processor communicates with the electronic carbon dioxide sensor and electronic temperature sensor and operates to periodically close the motorized door and to make measurements of carbon dioxide and temperature in the volume of the housing as closed using the electronic carbon dioxide sensor and electronic temperature sensor. A wireless transmitter receives the measurements of carbon dioxide and temperature and transmits those measurements.

It is thus a feature of at least one embodiment of the invention to provide a more readily deployable soil gas-flux sensor by distributing the gas sensors among the housings to permit untethered, wireless operation. Untethered operation is possible by a design that minimizes electrical consumption allowing self-contained battery power.

In one embodiment housings may include and support an electronic humidity sensor and/or an electronic soil moisture sensor to measure humidity in the volume of the housing and/or the moisture in the soil communicating with the volume of the housing, and the electronic processor may further communicate with these sensors and the wireless transmitter to transmit these humidity and soil moisture measurements.

It is thus a feature of at least one embodiment of the invention to exploit the availability of low-cost sensors for humidity and soil moisture to provide a more complete picture of the soil environment.

The system may further include a relay station providing a wireless receiver for receiving the measurements of carbon dioxide from multiple chambers and providing a wireless transmitter for retransmitting those measurements.

It is thus a feature of at least one embodiment of the invention to minimize the necessary power consumed by each of the sensor units while allowing long-range transmission.

The electronic carbon dioxide detector maybe a photoacoustic sensor.

It is thus a feature of at least one embodiment of the invention to greatly reduce the cost of the sensor units by focusing on the critical measurement of carbon dioxide and making use of solid-state sensors as opposed to laboratory gas analyzers.

The measure of the area opened by the vent door may be less than 20% of the measure of the volume.

It is thus a feature of at least one embodiment of the invention to minimize the vent door size and weight for practical low-cost, untethered, battery-powered operation.

The height, width, and depth of the volume of the housing may be equal to within 20%.

It is thus a feature of at least one embodiment of the invention to provide a volume form factor that provides good venting through a small door area.

The door may be at the upper end of the housing and may pivot vertically.

It is thus a feature of at least one embodiment of the invention to allow improved venting augmented by convection flow and horizontal wind flow over the housing door.

The housing may provide sidewalls of an opaque white polymer tube with the first opening being a first end of the tube and the second opening being a second opposite end of the tube.

It is thus a feature of at least one embodiment of the invention to provide a low-cost and easily manufactured housing.

These particular objects and advantages may apply to only some embodiments falling within the claims and thus do not define the scope of the invention.

DETAILED DESCRIPTION OF THE PREFERRED EMBODIMENT

Figure 1:
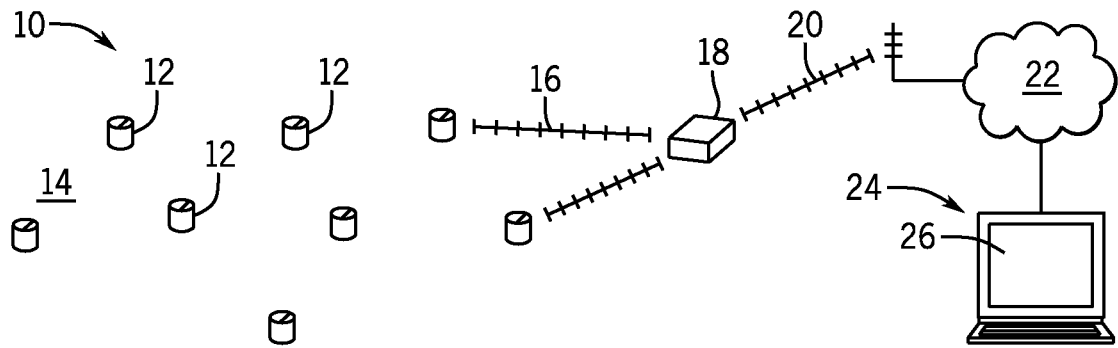
FIG. 1 is a perspective view of one possible deployment of sensor units per the present invention, each sensor unit communicating directly or indirectly with a gateway for transmission of data on a cellular link to a base station.

Referring now to FIG. 1, a soil gas-flux monitor system 10 for the present invention may provide for a plurality of physically independent sensor units 12 that may be distributed over the soil 14 of a field for the monitoring of soil gas flux in multiple corresponding locations.

The individual sensor units 12 may communicate by wireless signal 16, in parallel, or through a mesh network, with a gateway 18 to communicate with the gateway 18 measurement data including measurements of carbon dioxide ($CO_2$) concentration, humidity, air temperature, and soil moisture and soil temperature as will be discussed in greater detail below. In one nonlimiting embodiment, the wireless signal 16 may be provided by corresponding LoRa receivers and transmitters using spread spectrum, low-power communication having a range in excess of 1 km. Such receivers and transmitters are commercially available from Semtech of California and described in U.S. Pat. No. 9,647,718 hereby incorporated by reference. More than thirty sensor units 12 may communicate to readily available LoRa devices with the gateway 18. The invention contemplates that other low-power radio links may be used including those providing mesh networks. The wireless communication between the sensor units 12 and the gateway 18 offer a high degree of flexibility in locating each of the sensor units 12, for example, in a regular grid or arbitrarily as may be desired.

The gateway 18, in turn, may communicate, for example, through a cellular link 20 and the Internet 22 with a base station 24 which, in one example, may be a desktop computer having a display 26 for the display of sensor data as will be discussed below.

Figure 2:
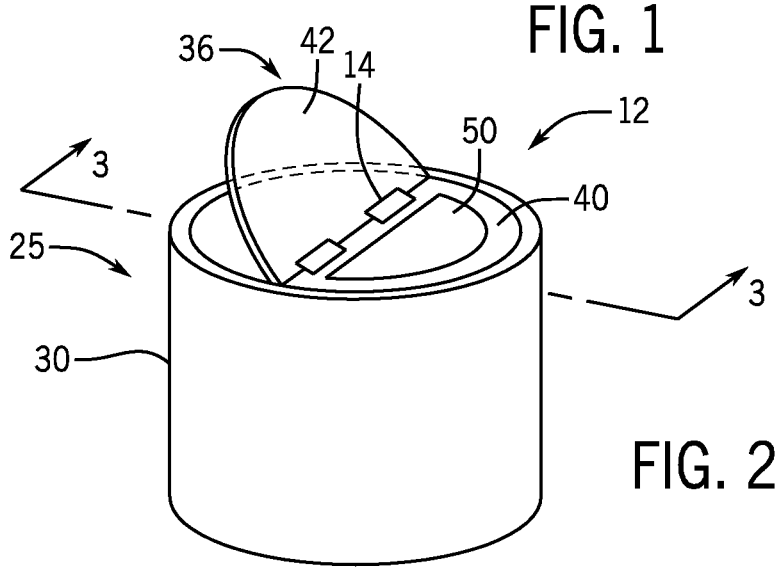
FIG. 2 is a perspective view of a single sensor unit showing a venting door in an open position.
Figure 3:
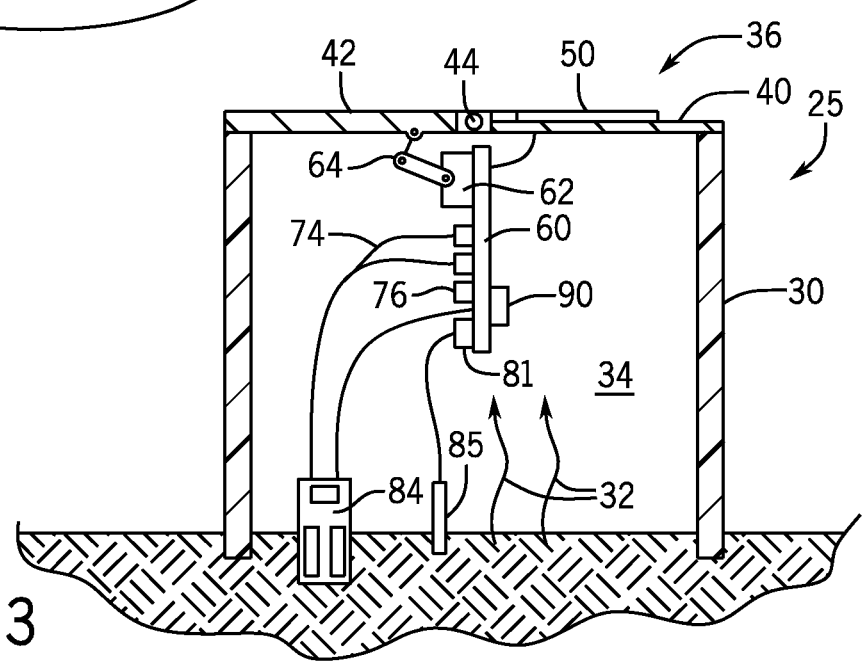
FIG. 3 is a cross-sectional view of the sensor unit of FIG. 2 taken along line 3-3 showing the venting door in a closed position and an internal printed circuit board and soil moisture sensor.

Referring now to FIGS. 2 and 3, in one embodiment each sensor unit 12 may be constructed with a housing 25 formed in part from an upstanding cylindrical tubular sidewall 30 formed of an opaque, white polyvinyl chloride material having a diameter substantially equal to height and, in one embodiment, having a diameter and height of approximately 7.9 inches. A lower end of the tubular sidewall 30 is open and may be supported directly on the surface of the soil 14 for receipt of moisture and gas 32 into an interior volume 34 of the housing 25 defined by the inner surface of the tubular sidewall 30, the upper surface of the soil 14, and a housing top plate 36 attached to the upper edge of the tubular sidewall 30. In some cases, the area of contact with the soil may be less than 80 $in^2$.

The housing top plate 36, in one embodiment, may be divided diametrically in two to hemicircular halves including a fixed plate portion 40 fixedly attached to the upper rim of the tubular sidewall 30 and a vent door 42 pivoting at a hinge 44 along the diametric division of the housing top plate 36. As so hinged, the vent door 42 may move between an upwardly extending position, shown in FIG. 2, allowing a vertical flow of gas exchange between the atmosphere and the interior volume 34 and a closed position, shown in FIG. 3, abutting the upper edge of the tubular sidewall 30 to block such gas exchange.

In one embodiment, the vent door 42 may be a transparent thermoplastic material allowing light to pass into the volume 34, and the fixed plate portion 40 may hold a solar cell 50 on its horizontal upper surface. In a second embodiment, the fixed placed portion may be transparent without the solar cell 50.

The small dimensions of the housing 25 and the form factor of the housing 25 reduce the surface area of the housing 25 relative to its interior volume 34, minimizing the distance between the opening provided by the vent door 42 in its open position and different locations in the volume 34. This promotes good venting of the interior volume 34 in between measurements of soil gas exchange while using a relatively small and lightweight vent door 42. In one example, the vent door 42 may control an opening that is less than 20% of the measured volume (using comparable units of length) and thus be of a size and weight to be readily moved using a battery-powered actuator as will be discussed below. Generally, the weight of the vent door 42 will be less than one quarter of the weight of the housing 25 components defining the volume 34.

The lower edge of the tubular sidewall 30 may be pressed slightly into the soil 14 to seal this lower edge against a typically irregular surface and held against the soil by the weight of the housing 25 without the need for additional base plates or other stabilizing features. The small area of the lower edge (having a wall thickness of approximately ⅜ of an inch) minimizes disruption of the soil both inside and outside of the housing 25. The white surface of the tubular sidewall 30 reduces heating from the sun and desirably has a solar absorption of less than 0.5.

Figure 4:
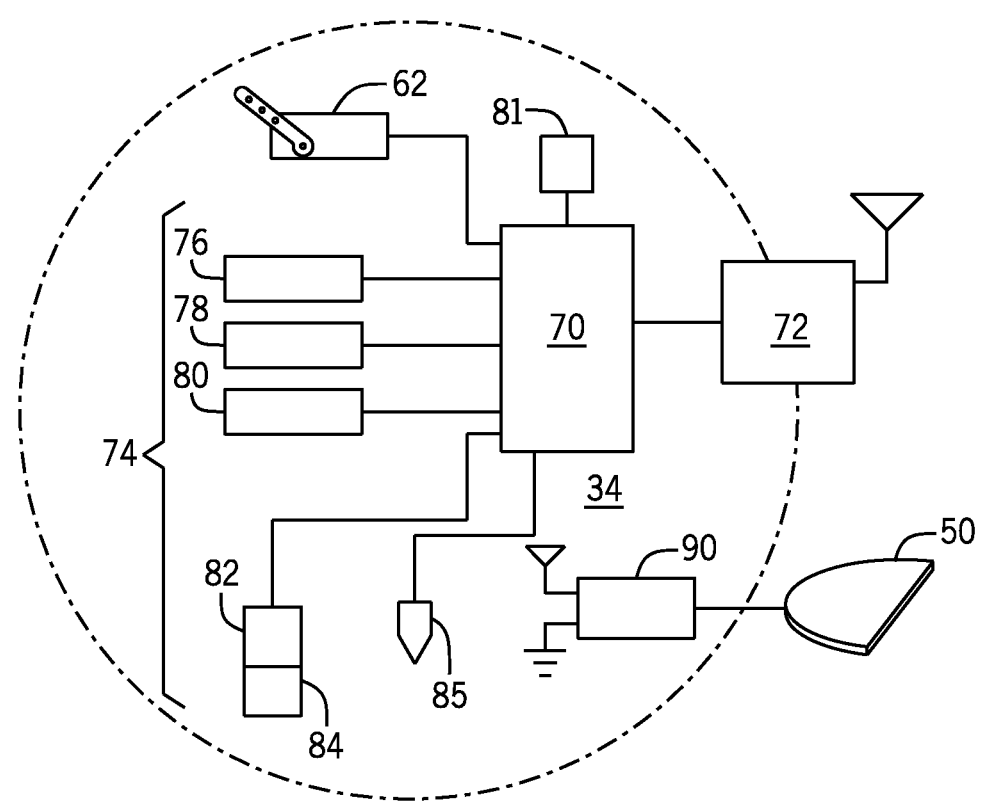
FIG. 4 is a block diagram of the electrical components of the sensor units of FIGS. 2 and 3.

Referring now to FIGS. 3 and 4, positioned within the interior volume 34 and supported by the housing 25 is a printed circuit board 60. The printed circuit board 60 may also support a servomotor 62 providing a linkage 64 for opening and closing the vent door 42 under the control of a microcontroller 70 also held on the printed circuit board 60. Generally, during use of the sensor units 12, the microcontroller 70 will open the vent door 42 for a predetermined time, for example, thirty minutes, to allow equalization of the atmosphere within the volume 34 and the outside air. Next microcontroller 70 will close the vent door 42 for thirty minutes making measurements of the interior volume 34 at the conclusion of this second thirty minute interval. This time interval may be adjusted statically or dynamically according to the desired sensitivity of measurement and desired timescale of the sampling.

The measurements made after closure of the interior volume 34 may be provided by a set of sensors 74 including a carbon dioxide sensor 76, a humidity sensor 78, an air temperature sensor 80, a air pressure sensor 81, a soil moisture sensor 82, and a soil temperature sensor 85. The first four sensors 74 may be mounted directly on the printed circuit board 60 while the latter two may connect with the printed circuit board 60 through a flexible wire harness, the soil moisture sensor 82 including an electrode portion 84 that is inserted directly into the soil 14 beneath the volume 34. Measurements by these different sensors 74 are communicated electrically and received by the microcontroller 70 to be relayed to wireless transmitter 72 for transmission to the base station 24 on a periodic basis. In between such measurements or actuations of the servomotor 62, the microcontroller 70 may move to a low-power sleep state.

Power for the printed circuit board 60 and the components attached to the printed circuit board 60 is provided by a battery 90 optionally supplemented by energy from the solar cell 50. A relatively small battery 90 may be used, for example, less than 4000 mA hours.

In one embodiment, the carbon dioxide sensor 76 may be a photoacoustic $CO_2$ sensor, for example, as is commercially available under the trade name of SCD-40 from Sensirion AG providing an accuracy of 50 ppm over a range of 400 to 2000 ppm and including an integrated temperature sensor 80 and humidity sensor 78. Readings from the carbon dioxide sensor 76 may be corrected with respect to temperature and/or moisture using a lookup table or the like implemented by the microcontroller 70 or any of the subsequent computing devices in the gateway 18 and base station 24.

The soil moisture sensor 82 may provide for a capacitive measurement of soil moisture, for example, using an ATSAMD10 based sensor available from Adafruit Industries of New York under the trade name STEMMA soil sensor, the barometric pressure sensor 81 may use the DPS310 sensor available from Adafruit Industries of New York under the trade name DSP310 Precision Barometric Pressure/Altitude Sensor, and the temperature sensor 85 may employ an encapsulated semiconductor temperature sensors such as the TMP36 commercially available from Adafruit Industries of New York under the trade name TMP#$^\wedge$ Analog Temperature Sensor soil sensor.

Figure 5:
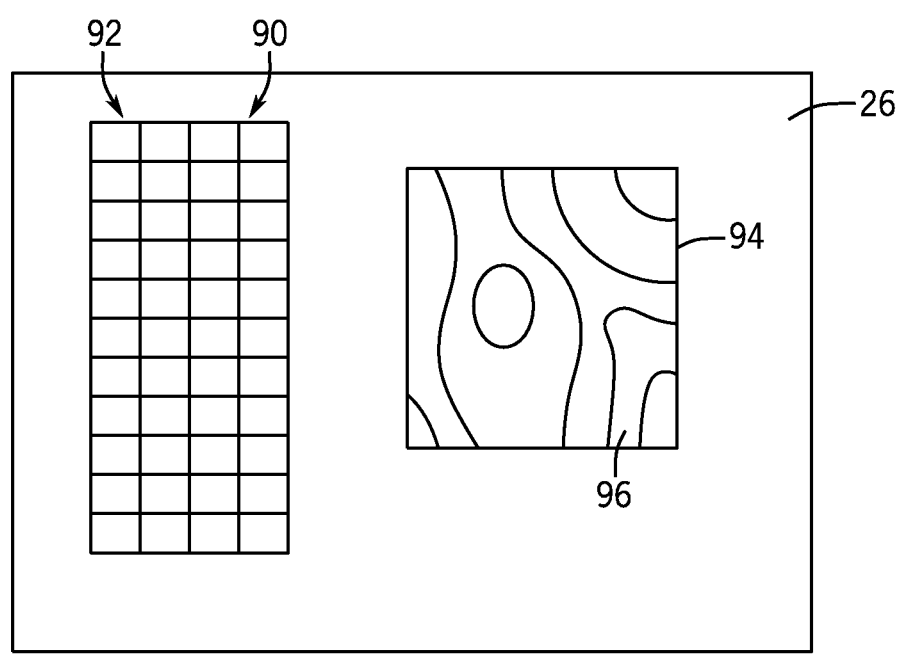
FIG. 5 is an example base station display of the data collected by the sensor units in tabular and heat map form.

Referring now to FIGS. 1 and 5, the display 26 may receive regular updates from each of the sensor units 12, including a sensor identification number 92 and values for $CO_2$, humidity, temperature, and soil moisture. These may be displayed in a tabular form 91, for example, indexed to a sensor identification number 92 that may be imported into a spreadsheet for further analysis. Alternatively this information may be displayed as a heat map 94 making use of measurement locations for each of the sensor units 12 (for example, entered manually) and which show, for example, isoflux lines 89 indicating $CO_2$ flux as a function of the location of the sensor unit 12.

It will be appreciated that other discrete sensors may also be incorporated into the sensor units 12, including, for example, an oxygen sensor.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. A soil gas-flux monitor system comprising:
at least one chamber having:
a housing with a lower surface for supporting the housing on a soil surface, the lower surface having a first opening positioned to receive gases from the soil surface into a volume of the housing;
a motorized door attached to a second opening in the housing to move between a closed position covering the second opening and an open position revealing the second opening to allow a free flow of outside air within the volume of the housing;
an electronic carbon dioxide sensor retained at an interior of the housing to measure carbon dioxide in the volume of the housing;
an electronic temperature sensor retained at an interior of the housing to measure temperature in the volume of the housing;
a chamber-dedicated electronic processor communicating with the electronic carbon dioxide sensor and electronic temperature sensor and operating to periodically close the motorized door and to make measurements of carbon dioxide and temperature in the volume of the housing when closed using the electronic carbon dioxide sensor and electronic temperature sensor;
a chamber-dedicated wireless transmitter receiving the measurements of carbon dioxide and temperature and transmitting those measurements;
a chamber-dedicated battery providing electrical power to each of the electronic carbon dioxide sensor, electronic temperature sensor, electronic processor, and wireless transmitter.

2. The soil gas-flux monitor system of claim 1 further including an electronic humidity sensor supported by the housing to measure humidity in the volume of the housing; wherein the electronic processor further communicates with the electronic humidity sensor to make measurements of humidity in the volume of the housing when closed using the electronic humidity sensor; and wherein the wireless transmitter further receives measurements of humidity and transmits the humidity measurements.

3. The soil gas-flux monitor system of claim 1 further including a soil moisture sensor adaptable for insertion into the soil communicating with the volume of the housing to measure the moisture of the soil;
   wherein the electronic processor further communicates with the electronic soil moisture sensor to make measurements of soil moisture in the soil communicating with the volume of the housing; and
   wherein the wireless transmitter further receives measurements of soil moisture and transmits the measurements of soil moisture.

4. The soil gas-flux monitor system of claim 3 wherein the electronic soil moisture sensor is a capacitive moisture sensor.

5. The soil gas-flux monitor system of claim 1 further including an electronic barometric pressure sensor supported by the housing;
   wherein the electronic processor further communicates with the electronic barometric pressure sensor to make measurements of air pressure in the volume of the housing; and
   wherein the wireless transmitter further receives measurements of air pressure in the volume of the housing and transmits the measurements of air pressure in the volume of the housing.

6. The soil gas-flux monitor system of claim 1 further including an electronic temperature sensor adaptable for insertion into the soil communicating with the volume of the housing to measure the temperature of the soil;
   wherein the electronic processor further communicates with the electronic temperature sensor to make measurements of soil temperature in the soil communicating with the volume of the housing; and
   wherein the wireless transmitter further receives measurements of soil temperature and transmits the measurements of soil temperature.

7. The soil gas-flux monitor system of claim 1 the chamber-dedicated battery is supported by the housing and provides electrical power to each of the electronic carbon dioxide sensor, electronic temperature sensor, electronic processor, and wireless transmitter.

8. The soil gas-flux monitor system of claim 1 further including a relay station providing a wireless receiver for receiving the measurements of carbon dioxide from multiple chambers and providing a wireless transmitter for retransmitting those measurements.

9. The soil gas-flux monitor system of claim 1 further including a base station for receiving the measurements and for providing a display including at least one of a table of measurements identified to each chamber and a map depicting the measurements as a function of their location.

10. The soil gas-flux monitor system of claim 1 wherein the electronic carbon dioxide detector is a photoacoustic sensor.

11. The soil gas-flux monitor system of claim 1 wherein the measure of an area of the second opening is less than 20% of the measure of the volume.

12. The soil gas-flux monitor system of claim 1 wherein a height, width, and depth of the volume are equal plus or minus 20%.

13. The soil gas-flux monitor system of claim 1 wherein an upper surface of the chamber provides a transparent window.

14. The soil gas-flux monitor system of claim 1 wherein the door is at an upper end of the housing and pivots vertically.

15. The soil gas-flux monitor system of claim 1 wherein the housing sidewalls are an opaque white polymer tube with the first opening being a first end of the tube and the second opening being a second opposite end of the tube.

16. The soil gas-flux monitor system of claim 1 wherein including a solar panel.

* * * * *